United States Patent [19]
Ober et al.

[11] Patent Number: 6,132,819
[45] Date of Patent: Oct. 17, 2000

[54] MICROPHASE STABILIZED FERROELECTRIC LIQUID CRYSTALS

[75] Inventors: Christopher K. Ober, Ithaca, N.Y.; Edwin L. Thomas, Natick, Mass.

[73] Assignees: Massachusetts Institute of Technology, Cambridge, Mass.; Cornell Research Foundation, Inc., Ithaca, N.Y.

[21] Appl. No.: 08/996,570

[22] Filed: Dec. 23, 1997

[51] Int. Cl.$^7$ .......................... C09K 19/38; C09K 19/42; C09K 19/12

[52] U.S. Cl. .................. 428/1.1; 252/299.01; 252/299.5; 252/299.65; 349/172

[58] Field of Search ........................... 252/299.01, 299.5, 252/299.65; 428/1.1; 345/97; 349/41, 172

[56] References Cited

U.S. PATENT DOCUMENTS 5,397,503   3/1995   Yuasa et al. ..................... 252/299.01

OTHER PUBLICATIONS

Mao et al., "Microphase–stabilized ferroelectric liquid crystals (MSFLC): bistable switching of ferroelectric liquid crystal–coi diblock copolymers," *Chem. Mater.* (1998) 6:1538–1545.

Mao et al., "Molecular Design, Synthesis And Characterization of Liquid Crystal–Coil Diblock Copolymers With Azobenzene Side Groups," *Macromolecules* (1997) 30:2556–2567.

Wen Yue Zheng et al., "Side Chain Liquid Crystalline Block Copolymers With Chiral Smectic C* Mesogens," *Liquid Crystals For Advanced Technologies, Symposium* (1996) 8–11:67–72.

Scherowsky et al., "Fast Switching Ferroelectric Liquid–Crystalline Polymers", *Liquid Crystals* 5(4):1281 (1989).

M. Brehmer and R. Zentel, "Ferroelectric Liquid–Crystalline Elastomers with Short Switching Times" *Macromol. Rapid Comm.* 16:659 (1995).

Ober et al., "Multiple length Self–Organization in Liquid Crystalline Block Copolymers" *Ma cromol. Symp.* 117:141 (May, 1997).

Brehmer et al., "Ferroelectric Block Copolymers" *Ma cromol. Symp.* 117:175 (May, 1997).

G. Galli, "Block Copolymers and Liquid Crystalline Block Copolymers: A Bird's–Eye View" *Ma cromol. Symp.* 117:109 (May, 1997).

Omenat et al., "Synthesis, Characterization and Physical Propoerties of New Ferroelectric Liquid Crystalline Materials: Block Copolymers" *Macromolecules* 1996(29):6730 (1996).

R. Zental and M. Brehmer, "Creat Ferroelectric Liquid Crystals Elastomers" *Chemtech*, p. 41 (May, 1995).

W.Y. Zheng and P.T. Hammond, "Synthesis of New Smectic C* Liquid–Crystalline Block Copolymers" *Macromol. Rapid Commun.* 17:813 (1996).

Mao et al., "Microphase Stabilized Ferroelectric Liquid Crystal (MSFLC) Bistable Switching of FLC–Coil Diblock Copolymer" *Polymer Prep.*38:374 (1997).

Thomas et al., "Influence of a Liquid Crystalline Block on Microdomain Structure" *Ma cromol. Symp.* 117:241–256 (May, 1997).

*Primary Examiner*—Shean C. Wu
*Attorney, Agent, or Firm*—Clark & Elbing LLP; Mary Rose Scozzafava

[57] ABSTRACT

A microphase stabilized ferroelectric liquid crystal (MSFLC) and optical device prepared therefrom are provided. The MSFLC includes a block copolymer, comprising at least one non-liquid crystal polymer block and at least one liquid crystalline polymer block including a chiral mesogenic side group, the block copolymer comprising domains of the non-liquid crystalline block of the non-liquid crystalline polymer and domains of chiral mesogenic polymer such that the domains form an inverted cylinder morphology. The volume percent and block size of the chiral mesogenic group are selected such that the spacings between cylinders is sufficient to permit switching of the chiral mesogenic group between two stable orientations.

33 Claims, 7 Drawing Sheets

MICROPHASE STABILIZED FERROELECTRIC LIQUID CRYSTALS

FIELD OF THE INVENTION

The present invention relates to ferroelectric liquid crystals. In particular, it relates to ferroelectric liquid crystalline block copolymers.

BACKGROUND OF THE INVENTION

Liquid crystals (LCs) are molecules which exhibit self organization into orientationally ordered phases (nematic phases). In addition, many liquid crystals form smectic phases in which the molecules are oriented and arranged in layers. One class of smectic phase, the chiral smectic-C ($S_C^*$) liquid crystal, contains molecules oriented with their axes tilted with respect to the normal of the layers. The tilt of the axis in a given layer rotates progressively a small amount from layer to layer in the $S_C^*$ liquid crystal. The total thickness of the liquid crystal layers required for the molecular axes to precess through 360° is known as the supramolecular pitch. The supermolecular pitch is small, generally on the order of 1–3 microns.

Figure 1:
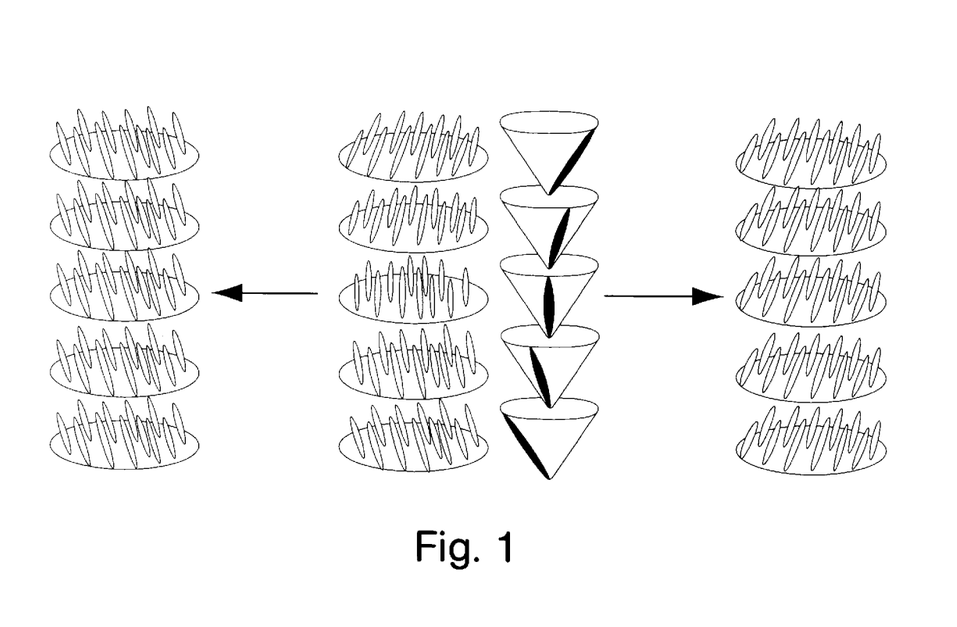
FIG. 1 is an illustration of the supramolecular pitch of a smectic-C* liquid crystal and its unwinding.

Each layer of an $S_C^*$ liquid crystal is spontaneously polarized and undergoes a change in orientation upon application of a threshold electrical field strength. The direction of polarization changes with each layer due to the axes tilt from one layer to the next. In order for such a phenomenon to be useful in display applications, it is necessary to "unwind" the supermolecular pitch of the ferroelectric liquid crystal, as these materials as known, so that the axes of each successive LC layer are identically oriented (the so-called "bookshelf" arrangement). FIG. 1 illustrates the supramolecular pitch of a smectic-C phase and its unwinding to obtain an aligned liquid crystal.

Ferroelectric liquid crystals (FLCs) have attracted great interest since the discovery in 1980 of electro-optic switching using surface stabilized FLCs (SSFLCs). In this process, the top and bottom surfaces of the FLC display panel (thin layer of FLC between glass electrodes) are rubbed, which causes the FLC tilt angles at these surfaces to align resulting in an "unwinding" of the helical pitch. The unwinding of the supramolecular pitch within a small gap on the order of 1–3 microns is difficult to precisely control. Further, this thin gap limits the panel size and the use of glass substrates and a low molar mass FLC results in poor mechanical properties.

As a result of the shortcomings of low molecular weight liquid crystal systems, polymeric FLCs have been investigated. Block copolymers and liquid crystals are both known to form ordered structures at the monomer, mesogenic and microdomain dimensions. These materials permit the manipulation of the liquid crystal order by control of both the liquid crystal and block copolymer components of the composition. As an added advantage, polymeric materials tend to be easier to process and provide the possibility of preparing flexible display panels. However, the higher molecular weight of the polymeric systems also lead to higher viscosity, resulting in slower response times in an applied electric field.

Liquid crystal-containing block copolymers have been reported. Scherowsky et al. (*Liq. Cryst.* 5:1289 (1989)) have reported a FLC (poly)acrylate which has a switching time of 0.5–5 milliseconds with a number average molecular weight ($M_n$) of 15,000 at ~120–130° C. Takahashi et al. (*Liq. Cryst.* 8:33 (1991)) report that FLCs with a poly(siloxane) backbone possess a 33 millisecond switching time at 43° C. Zentel and Brehmer (*Macromol. Rapid Commun.* 16:659 (1995)) prepared FLC elastomers by photo-crosslinking monodomain FLC poly(siloxane)s in a bookshelf arrangement. Although these results suggest promising properties using polymeric FLCs, the switching properties are too slow for use in optical display panels.

Omenat et al. (*Macromol.* 29:6730 (1996)) report a series of side-group FLC-diblock copolymers in which only monostable switching was observed. The composition consisted of a poly(isobutyl vinyl ether) chain and a chiral liquid crystalline block.

There remains a need to provide a FLC system which is capable of rapid bistable switching in an applied field.

It is an object of the present invention to provide a flexible, thin FLC-polymer display device which demonstrates bistable switching.

It is a further object of the present invention to provide an FLC-polymer which demonstrates rapid switching over reasonable temperature ranges.

SUMMARY OF THE INVENTION

The present invention is directed to a microphase stabilized ferroelectric liquid crystal (MSFLC) using FLC-coil block copolymers which exhibit bistable switching in an applied field. The MSFLC composition of the invention has an inverted cylinder morphology, in which the non-liquid crystalline (coil) polymer forms a cylindrical domain in a matrix of liquid crystal copolymer. The liquid crystal is comprised of a chiral mesogen which is capable of exhibiting electro-optical properties when properly aligned.

In on aspect of the invention, a microphase stabilized ferroelectric liquid crystal, includes a block copolymer, comprising at least one non-liquid crystal polymer block and at least one liquid crystal polymer block including a chiral mesogenic pendant group, the block copolymer comprising domains of the non-liquid crystal polymer and the liquid crystal polymer such that the non-liquid crystal polymer block forms an inverted cylinder morphology in a matrix of the liquid crystal polymer block, wherein spacings between cylinders is sufficient to unwind the smectic * helix and to permit switching of the chiral mesogenic group between two stable orientations.

By "ferroelectric liquid crystal polymer" or "FLC-polymer", as those terms are used herein, it is meant a polymeric material which exhibits ferroelectricity (spontaneous electrical polarization) due to orientation of constituent chiral mesogenic groups of the polymer.

By "block copolymer" as that term is used herein, it is meant a copolymer (a polymer comprising two or more different monomer units) in which like monomer units occur in relatively long alternating sequences to form the backbone of the polymer. The block copolymer of the invention includes at least one class of monomer unit which is functionalized with a chiral mesogenic side chain.

Figure 2:
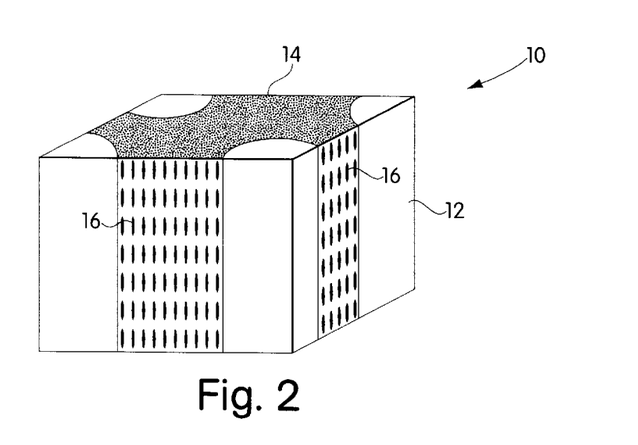
FIG. 2 is an illustration of the inverted cylinder morphology of the FLC polymer of the invention.

The term "inverted cylinder" is used herein to designate an FLC-polymer microphase morphology in which the non-liquid crystalline, or coil, polymer is organized into cylindrical domains which are imbedded in a continuous matrix of liquid crystalline copolymer. An inverted cylinder morphology 10 is illustrated in FIG. 2 in which cylindrical domains 12 of a coil block copolymer are shown imbedded in a matrix 14 of chiral mesogen block copolymer. Individual mesogenic side groups 16 are shown aligned within the liquid crystal domain. Although not shown, each mesogen 16 is attached to the polymer backbone of the chiral mesogen block copolymer through covalent or other associative bonding mechanisms.

In another aspect of the invention, a microphase stabilized ferroelectric liquid crystal is provided including a ferroelectric liquid crystal, a first non-liquid crystal copolymer block, and a second copolymer block including attachment sites along the polymer backbone for interaction with the ferroelectric liquid crystal. The first and second polymer blocks are arranged into domains of first non-liquid crystalline copolymer and domains of second copolymer such that the non-liquid crystal polymer forms an inverted cylinder morphology in a matrix of the second copolymer such that spacings between cylinders is sufficient to unwind the smectic * helix and to permit switching of the ferroelectric liquid crystal between two stable orientations.

In another aspect of the invention an optical device is provided. The device includes opposing electrode surfaces; and a microphase separated ferroelectric liquid crystal disposed therebetween. The microphase stabilized ferroelectric liquid crystal includes a block copolymer, comprising at least one non-liquid crystal polymer block and at least one polymer block including a chiral mesogenic side group, the block copolymer comprising domains of non-liquid crystalline polymer and domains of chiral mesogenic polymer such that the domains form an inverted cylinder morphology. The volume percent and block size of the chiral mesogenic group is such that the spacings between cylinders is sufficient to permit unwind the smectic * helix and to switching of the chiral mesogenic group between two stable orientations.

By "spacings", as that term is used herein, it is meant the center-to-center distance between adjacent, parallel cylindrical domains or the distance between liquid crystal groups as determined by X-ray diffraction (XRD).

The FLC-coil block copolymer compositions may be prepared at much greater thicknesses than possible for conventional SSFLCs. Further, due to their polymer or plastic component, they are flexible and self-supporting. No parallel glass plates are required, as is required to encase the convention liquid FLCs and hence the MSFLC-polymer devices of the invention represent a significant improvement over conventional FLC devices.

BRIEF DESCRIPTION OF THE DRAWING

The invention is described with reference to the figures, which are provided for the purpose of illustration only and are not intended to be limiting of the invention and in which.

FIG. 4 is a plot of the electro-optical response (lower curve) for the sample SIC*10-41/63 (see Table 1 for sample description) (A) at 110 without shearing; (B) at 110° C. with shearing; and (C) in the $S_A$* phase (120° C.);

FIG. 7 is a cross-sectional transmission electron photomicrograph of the oriented FLC phase of the block copolymer of the invention (A) along the shear axis and perpendicular to the electric field of the copolymer; and (B) perpendicular to both the shear axis and electric field of the copolymer.

DETAILED DESCRIPTION OF THE INVENTION

Figure 3:
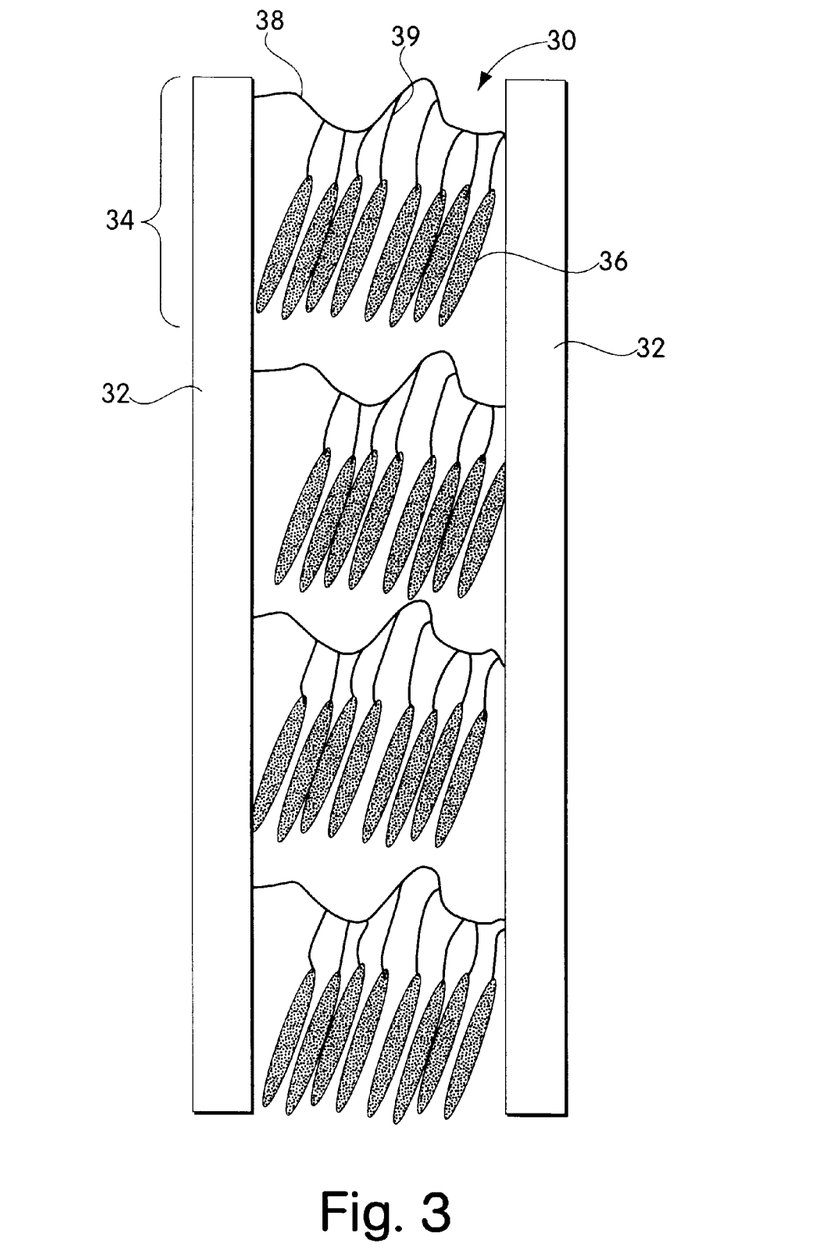
FIG. 3 is a pictorial illustration of a "bookshelf" arrangement of the mesogenic side groups in the FLC block copolymer.

The applicants have surprisingly discovered that an FLC-coil block copolymer having an inverted cylinder morphology exhibits electro-optical behavior and bistable switching when subjected to an electric field. The FLC-coil block copolymer includes a non-liquid crystalline polymer component ("coil polymer block") arranged in cylindrical domains in a continuous matrix of an FLC-block copolymer ("FLC-polymer block"). The FLC-polymer block includes pendant chiral mesogenic groups which provide ferroelectric properties to the polymer. The cylindrical morphology of the coil polymer block provides the mesogen of the FLC polymer block with locally "flat" interface regions for organization into layers, as is demonstrated in FIG. 2. The mesogenic side groups are presumed to organize into a "bookshelf" arrangement as is illustrated in FIG. 3. The bookshelf arrangement includes FLC blocks 30 arranged between cylinders 32 of the coil block copolymer domains. The FLC blocks 30 arrange in layers 34 in which mesogenic side groups 36 extend from polymeric backbone 38. Note the presence of a chemical spacer group 39.

Electro-optical switching behavior has most commonly been ascribed to lamellar block copolymer structures. It was heretofore believed that the lamellar structure was desired in order to obtain the unwound smectic-C* domains required for ferroelectric behavior. The present invention has surprisingly shown that it is possible to achieve electro-optical performance and bistable switching in block copolymer structures having an inverted cylinder morphology. In addition, the inverted cylinder morphology provides several advantages over lamellar morphologies.

Firstly, the optical response of the MSFLC of the invention is optimized because the inverted cylinder morphology provides a higher volume percent of LC phase in the composition while retaining a preferred smectic-C organization. The morphology of the composition depends upon the relative volume fraction of the coil and LC copolymer blocks. At low coil copolymer volume fractions, non-LC polymer spheres are imbedded in a continuous LC block polymer matrix. Such morphologies are not desirable because the curved surfaces of the spherical domains tends to disrupt alignment of the mesogenic side groups within the LC domain. At higher coil copolymer volume fractions (ca. 0.35–0.65), a lamellar structure is favored. At intermediate volume fractions for the coil polymer block (ca. 0.25–0.35), cylindrical structures are formed. The cylinders of the minority coil block provide a suitable "flat" surface for LC mesogen orientation, while maximizing LC volume fraction, thereby representing the most favorable compromise between competing factors.

Secondly, the large sheet-like domains of lamellar structures result in large grain boundaries which are sensitive to defects. In comparison, in the inverted cylinder structure of the present invention, the mesogens do not align over such long dimensions and are more strongly constrained by the closer adjacent coil block copolymer domains. Any disclinations are bound to lie in the direction of the cylinders and deleterious optical effects such as scattering are minimized. Thus, defect density is limited and optical response is improved.

Thirdly, the mechanical anisotropy of the lamellar and the inverted cylinder morphologies are different. Application of a mechanical strain can change the spacing between non-LC phases and packing in both morphologies; however, the direction of the applied strain will have a different effect, depending upon the nature of the block copolymer morphology. It may therefore be possible to build different structures with an inverted cylinder morphology, which have better responsiveness to applied strains. As a result of the stronger orientation of the mesogenic groups in the inverted cylinder phase and the greater ease of alignment of cylinders, more efficient orientation of the liquid crystal block copolymers may result.

The MSFLC composition of the invention is comprised of at least two copolymer blocks (a diblock copolymer) in which one block contains the chiral mesogenic group. It is within the scope of the invention, however, for the composition to include more than two copolymer blocks, e.g., a triblock or greater. It may be desirable to adjust volume fraction (and hence microstructure) or mechanical properties using this strategy. It is further within the scope of the invention to include more than one type of chiral mesogenic group. The different mesogenic groups may make up a single block of the block copolymer, e.g., a single block having a mixture of mesogenic groups.

In obtaining the desired optical bistability, it is also recognized that an optimal relationship may exist between the molecular weight of the block copolymer composition of the invention and the spacings between cylindrical domains of the coil block copolymer. The size of the cylindrical domains will be a function of the size (hence, molecular weight) of the coil block. While it is desirable to minimize the volume fraction of coil block component of the composition, as discussed above, one reaches a lower limit below which spheres will form. Conversely, very high molecular weight polymers are extremely viscous, which is expected to have a detrimental effect on the switching capability and ease of handling of the polymer for optical applications, as well as favor formation of lamellar structures. The coil block should constitute no more than 50 vol % of the block copolymer and may be as little as 10 vol. Preferably the coil polymer block occupies 25–40 vol % of the polymer composition. Preferred ranges may vary with the composition of the FLC-polymer and coil polymers used in the MSFLC-polymer of the invention. The desirable cylinder phase may be observed over a greater compositional range than that expected for coil-coil blocks, e.g., non-LC-containing block copolymers, since the LC-block stabilizes the cylinder microstructure.

Further, it is desired that the spacing between cylindrical domains is sufficiently large to permit bistable switching. The minimal spacing requirement is a function to a certain degree of the particular mesogenic side group. For example, the larger the mesogen and/or its switching angle, the greater the spacing desired for rapid bistable switching. In general, it is desired that the spacing between cylinders be in the range of about 10 nm to 200 nm and preferably about 100 nm.

Such spacings will be a function of the molecular weight of the FLC-polymer block. In order to achieve these desirable parameters, the volume fraction and minimal block size of the LC-block may be defined. The overall volume fraction of the FLC-block copolymer is preferably in the range of 50 vol % to 90 vol %. Molecular weights of the overall polymer may be in the range of 15,000 to 500,000 g/mol to provide these spacings. In addition, the block size of individual LC-blocks is preferably in the range of about 10,000 to 250,000 g/mol.

Suitable chiral mesogens for use as mesogenic side chains in the FLC-polymer may be selected from the conventional molecules recognized as forming chiral smectic-C* phases, that is known FLCs. Consideration should be given in selection of an appropriate chiral mesogen of its chemical, thermal and electrical stability. In addition, the mesogen may be functionalized so as to chemically link the mesogen to the copolymer backbone. While the examples listed have used only one ferroelectric LC group, many are possible. Examples of possible mesogenic structures are given in the *Handbook of Liquid Crystal Research* (P. J. Collins and J. S. Patel, Eds.; Oxford University Press, New York 1997 pp. 40–70), which is hereby incorporated in its entirety by reference. Typical mesogens include 2 and 3 phenylene ring mesogenic structures as well as cycloaliphatic and pyrimidine containing mesogenic groups to modify phase transition behavior. Substituents such as fluorine may also be used to modify LC behavior. It is also possible to include more than one mesogenic group on the LC block in order to adjust LC temperature range.

In a preferred embodiments, the chiral mesogenic side group further includes a chemical spacer group. The chemical spacer typically is disposed between the copolymer backbone and the mesogenic side group. The chemical spacer is "floppy" or non-rigid and provides a greater degree of motion to the mesogenic group. This may aid in the ease at which the chiral mesogen can switch orientations in an electric field. The chemical spacer may be a saturated hydrocarbon chain, such as —$(CH_2)_n$—, where n in the range of about 2 to 15; or it may be siloxy or oxyethylene spacers.

A wide variety of polymers may be used in the FLC-polymer of the invention. Suitable block copolymers for use as a coil copolymer include polystyrene, and other styrenic polymers, polyisoprene and other dienes polymers, polysiloxanes, poly(vinylmethyl ether) and other vinyl ethers, poly(methacrylate)s or virtually any polymer segment with the right combination of polymerizability, immiscibility with the LC-block and appropriate glass transition temperature ($T_g$). Suitable block copolymers for use preparation of the FLC-block copolymer (by linking with the mesogen) include those polymers systems named above for use as a coil polymer which can be polymerized by living methods and which can be either modified for mesogenic group attachment or may be directly polymerized with attached mesogenic groups.

In other embodiments of the invention, free or unbound mesogen may be added to the composition. The mesogen is expected to localize in the FLC-polymer block domain, by inserting itself between organized mesogenic side groups or by forming its own mesogen layer within the domain. Suitable free mesogens include those listed above for preparation of the mesogenic side groups. It is contemplated that addition of free mesogen will have a desirable effect on switching time and temperature. The free mesogen is unattached and therefore will undergo a change in orientation (switching) more readily at lower temperatures and higher rates. It is contemplated that the presence of free mesogen will enhance the switching time and temperature of bound mesogenic groups via a plasticization effect. Free mesogen may be added to the FLC-polymer block domain in the range of 1–75 vol %, and more preferably in the range of 15–50%.

In another aspect of the invention, the inverted cylinder morphology may be prepared using added low molar mass liquid crystal (LMMLC) or, alternatively, surfactants to adjust the volume fraction of the LC domain. Plasticizers may also be used. The purpose of these materials is to improve LC switching time by introducing more mobile low molar mass materials. Instead of chemically linking the mesogen to an FLC-block copolymer, the additive, which is confined to the liquid crystal polymer domain, interacts with the polymer backbone in a non-covalent manner. The additive may also interact at attachment sites on the polymer backbone. Attachment sites may be reactive or polar regions or sites on the polymer backbone or pendant groups along the polymer backbone. By leaving free attachment sites on the polymer backbone, it may be possible to coulombically bind or hydrogen bond these additives in the LC region. Such materials may include mesogenic groups with hydrogen bonding or ionic groups, low molar mass mesogenic groups or readily available surfactants in which a polar or ionic group is present. The unbound or coulombically attached additive further will interact favorably with the mesogen in arrangement of the LC and coil polymer domains.

The inverted cylinder FLC-coil block copolymers of the invention represent the example of first bistable, switchable microphase stabilized FLCs. Bistable switching times in the range of 1 $\mu$sec to 2 sec have been observed at temperatures of about 100° C. See, Examples. It is anticipated that switching times on the order of milliseconds may be observed at significantly lower temperatures, e.g., room temperature, by appropriate selection of coil and FLC polymer block compositions in order to provide desired cylinder spacings for optimal switching and addition of free mesogen to the composition. Although not intended to be bound by any theory or explanation, it is believed that the block microdomains of the copolymer composition, which are on the order of 100 Angstroms, serve to unwind the FLC supramolecular pitch which is on a much larger scale (~1–2 $\mu$m).

In another embodiment of the invention, optical cells are provided for display purposes. An optical display includes opposing electrode surfaces with the MSFLC polymer of the invention disposed there between. An advantage of the display device is that the electrodes may be of a flexible material, such as a polymeric sheet.

Optical cells may be prepared for testing optical response properties of the material by sandwiching the block copolymer sample between two glass plates. Interestingly, in optical cells prepared without shearing, the inverted cylinder FLC-coil block copolymer showed only electroclinic switching over the entire $S_C^*$ temperature range. Switching was observed even below the glass transition temperature of the polystyrene block. This is significant as it demonstrated that the method permits the presence of glassy regions which might otherwise hinder the physical motion of the switching mesogenic groups. In optical cells prepared with shearing, the optical response of the FLC-coil block copolymer demonstrated two stable ferroelectric switching states. Bistable switching was observed in the temperature range of the $S_C^*$ phase and above the glass transition temperature of the polystyrene block.

Figure 4A:
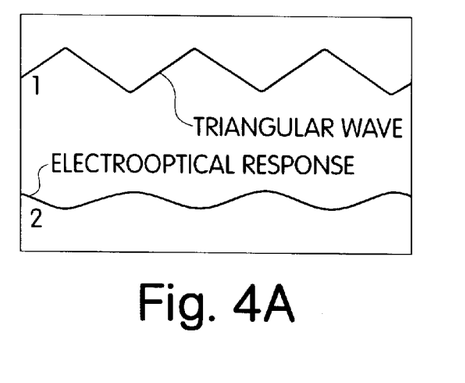
Figure 4B:
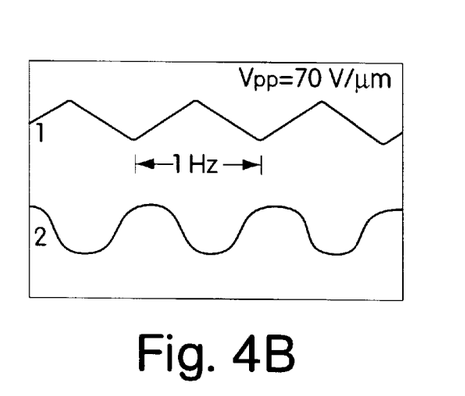
Figure 4C:
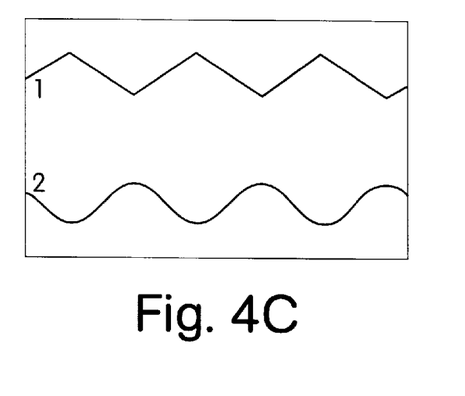

FIG. 4 demonstrates the electro-optical response (lower curve) for the sample SIC*10-41/63 (see Table 1 for sample description) under various conditions. A cell with a 10 $\mu$m gap was prepared and subjected to an electric voltage of 700 V (1.0 Hz). In FIG. 4A, the optical response of the material at 110 ° without shearing is electroclinic. The same material prepared with shearing demonstrates bistable switching, as shown in FIG. 4B. The switching rate is in the range of a fraction of a second. Finally, when the material is heated into the $S_A^*$ phase, the optical response becomes electroclinic again (FIG. 4C).

This observation is consistent with the presence of unoriented microdomains in the LC matrix of the inverted cylinder prior to shearing. Apparently, without an orienting force, the FLC domains do not form the monodomain bookshelf structure necessary for bistable switching. Thus, it is desirable to orient the block microdomain containing the mesogen in order to align and lock-in the orientation of the mesogen. Such orientation may be accomplished by application of external flow fields, such as shearing, as heretofore described. Flow field forces include uniaxial shear, extensional flow (roll casting) and steady-state shear using parallel plates. Other methods of orientation are contemplated as within the scope of the invention, such as by way of example only, orientation in magnetic or electric fields.

Lower molecular weight blocks did not exhibit bistable switching behavior, suggesting that there is a lower limit to FLC domain size in order to obtain the desired optical property. This may indicate that there is a lower limit to the domain spacings, below which bistable switching is not favored, as is discussed hereinabove.

Method of preparation of LC-block copolymers. Conventional methods of preparing LC side-chain substituted block copolymers may be employed. For example, monomers with and without a mesogenic side chain may be prepared and copolymerized. Alternatively, a block copolymer may be prepared and selective sections thereof may be functionalized with a mesogenic side group. Several synthetic routes are suitable for the preparation of LC-block copolymers, including living anionic, radical, group transfer and cationic polymerization. In preferred embodiments, the FLC-coil block copolymers of the present invention may be prepared by conventional anionic polymerization of the diblock copolymers, followed by coupling of the copolymer with the desired chiral mesogen. These and other synthetic techniques are known in the art. The interested reader is directed to *Principles of Polymerization* (G. Odian, 2nd Ed., Wiley, New York, 1981) and *Polymer Synthesis* (P. Remp and E. W. Merrill, Heuthig and Wepf, New York. 1986). which are hereby incorporated by reference, for further detail.

Figure 5:
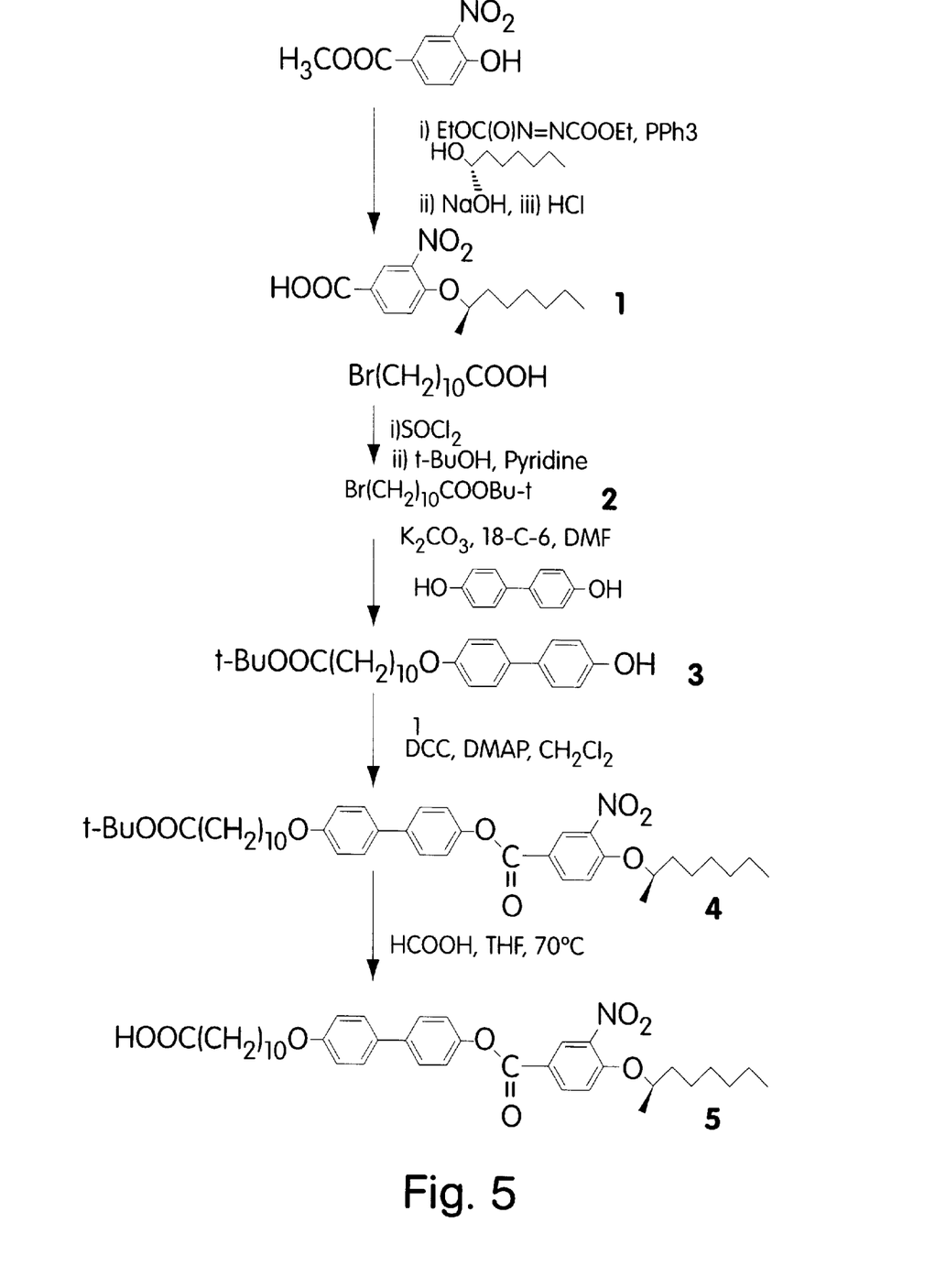
FIG. 5 demonstrates the synthetic route for the preparation of a mesogen for use in the MSFLC composition of the present invention.

Synthesis of exemplary mesogen and FLC-coil diblock copolymer. The synthesis of carboxylic acid-containing mesogen, $C_8H_{17}*O\text{-}Ph(3\text{-}NO_2)COO\text{-}PhPh\text{-}O(CH_2)_{10}COOH$, is shown in FIG. 5. In preparation of the mesogenic group, a carboxylic group was used as the reactive group for attachment to the block copolymer backbone. A t-butyl group was used to protect the acid and the chiral groups were introduced into the mesogen in the last possible step. A strong electron-withdrawing group (—$NO_2$) was employed closed to the chiral center in order to increase magnitude of spontaneous polarization ($P_2$). Compound 1 ($C_8H_{17}*O\text{-}Ph(3\text{-}NO_2)COOH$) was synthesized using the Mitsunobu reaction as described by Mitsunobu in Synthesis 1981:1 (1981), which is hereby incorporated by reference.

(a) Synthesis of $Br(CH_2)_{10}COOtBu$ (2). Compound 2 was prepared by coupling the corresponding acid chloride with t-butyl alcohol in the presence of pyridine and N,N-dimethylaminopyridine (DMAP) as a catalyst. Yield: 55%; bp: 135° C. (0.2 mmHg).

(b) Synthesis of $HO\text{-}PhPh\text{-}O(CH_2)_{10}COOtBu$ (3). Compound 3 was prepared as followed. 12.2 g 1,4-biphenol (65.4 mmol) was put into a 500 ml flask, followed by addition of 3.9 g anhydrous $K_2CO_3$ (28.3 mmol), 100 mg 10-crown-6, 20 mg potassium iodide (KI) and 150 ml anhydrous dimethyl formamide (DMF). The solution was heated to 95° C. for 15 minutes. To this solution $Br(CH_2)_{10}COOtBu$ (7.8 g, 21.8 mmol)in 15 ml DMF was added dropwise. The solution was then stirred at 95° C. for 12 hours. After cooling, the mixture was poured into 400 ml water which contained 2 ml acetic acid. The white precipitate product was filtered and washed with water. After drying overnight in a vacuum oven, the product was purified by flash column chromatography using 1:3 (v/v) ethyl acetate:hexane solution as the elution solvent. Compound 3 (7.0 g) was obtained and verified by $^1$H-NMR spectroscopy.

(c) Synthesis of $C_8H_{17}$*O-Ph(3-$N_2$)COO-PhPh-O($CH_2$)$_{10}$COOtBu(C*10-ester, 4) Compound 1 (2.07 g, 7.05 mmol), compound 3 (3.0 g, 7.05 mmol) and DMAP (123 mg, 0.84 mmol) were added to a 150 ml flask (flask A) and dried under vacuum for 2 hours, after which methylene chloride (60 ml) was added to dissolve reactants. To flask B, dicyclohexyl dicarbodiimide (DCC, 1.74 g, 8.46 mmol) was dissolved in anhydrous methylene chloride (15 ml). The DCC solution in flask B was then slowly added via cannula into flask A, which was cooled to 0° C. The solution was stirred overnight. The white precipitate was filtered and the filtrate was reduced to dryness and purified by flash chromatography using 1:5 (v/v) ethyl acetate:hexane as the eluant. Compound 4 was obtained in 86.6% yield and verified by $^1$H-NMR spectroscopy.

(d) Synthesis of $C_8H_{17}$*O-Ph(3-$NO_2$)COO-PhPh-O($CH_2$)$_{10}$COOH (C*10-acid, 5) Deprotection of the t-butyl group was accomplished using formic acid in THF solution at 70° C. for two hours. The conversion was almost quantitative, with no reaction at the central ester bond. Formation of compound 5 was confirmed by $^1$H-NMR spectroscopy.

(e) Synthesis of $C_8H_{17}$*O-Ph(3-$NO_2$)COO-PhPh-O($CH_2$)$_{10}$COOCl (C*10-acid chloride, 6) Compound 5 was converted to the acid chloride by treatment with oxalyl chloride. Recrystallization was performed three to four times from 10:1 hexane:toluene (v/v) and $K_2CO_3$ fine powder was used to absorb polar impurities. Polar impurities are generally difficult to remove in recrystallization processes since they serve as nuclei for future crystal growth. The use of fine $K_2CO_3$ was effective in absorbing any polar impurities.

Figure 6:
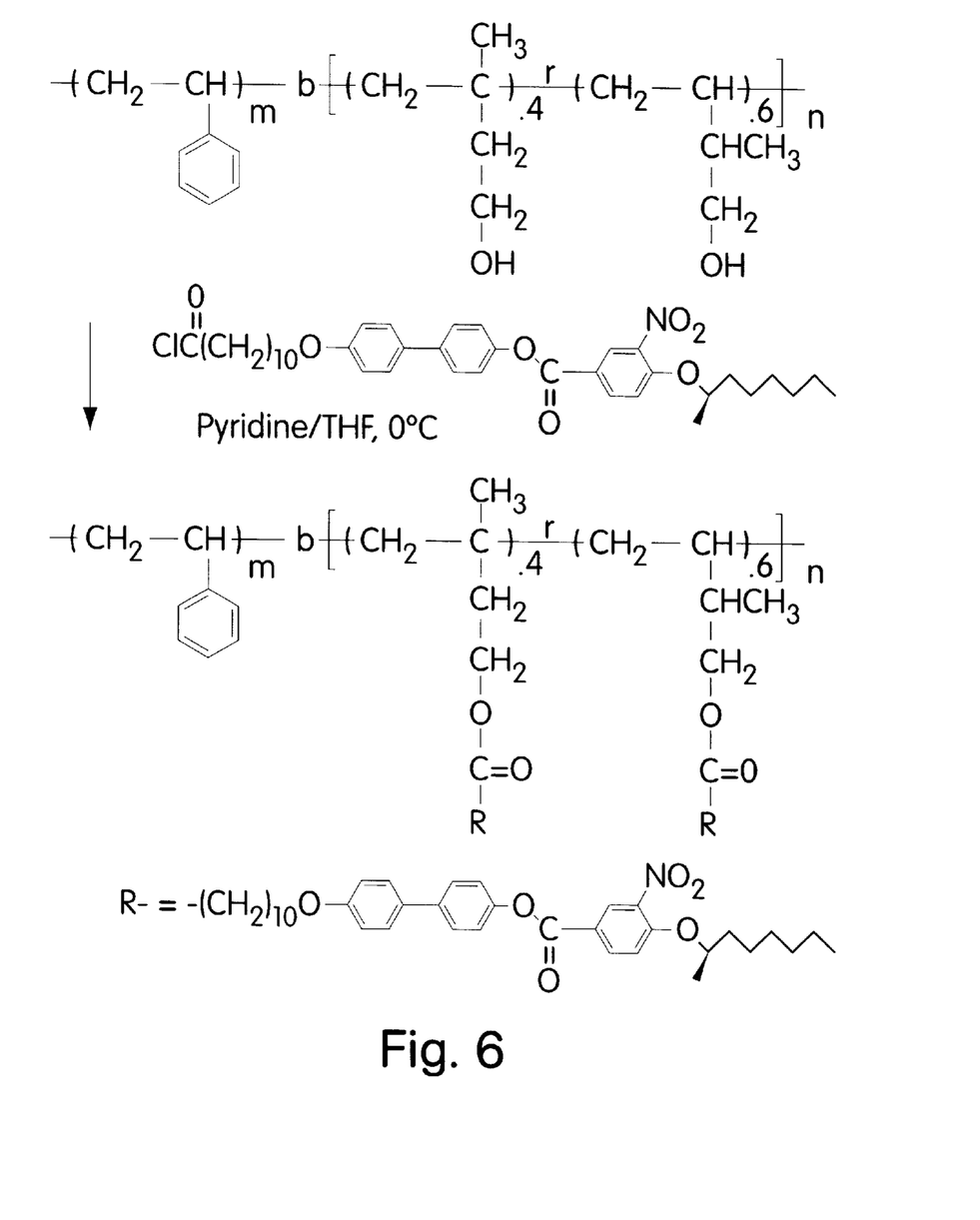
FIG. 6 demonstrates the synthetic route for coupling of the mesogen to the copolymer backbone.

(f) Synthesis of FLC-coil diblock copolymer. After vacuum drying, acid chloride 6 was used immediately for attachment to a hydroxylated polystyrene block copolymer as set forth in the reaction scheme of FIG. 6. Synthesis of the polystyrene block copolymer is set forth in Mao et al, Macromolecules 30:2556 (1997) and G. Mao and C. Ober, *Acta Polymerica*, 50: 405–422 (1997), which are hereby incorporated by reference. The styrene-isoprene block copolymer was first hydroborated and then oxidized to obtain the hydroxylated product. Hydrolysis of NaB(OH)$_4$ was prevented by first freezing the aqueous phase after hydroboration and then precipitating the polymer solution in THF into 0.3 M KOH solution. The product FLC block copolymer was purified by Soxhlet extraction with 95% ethanol until no free molecule mesogen was detected.

Liquid crystal phase behavior. A variety of FLC homopolymers (only a single monomer making up the polymer backbone) and FLC-coil diblock copolymers were prepared according to the method described above. The properties of these FLC polymers are summarized in Table 1, where S=styrene; I=isoprene; SI=styrene-isoprene block copolymer; C*10=chiral mesogenic group including a ten methylene group spacer; x=$M_n$ of polystyrene block (kg/mol); and y=$M_n$ of FLC block (kg/mol).

TABLE 1

| sample | weight fraction LC (%) | GPC ($M_w/M_n$)$^b$ | thermal transitions$^c$ | ΔH (J/g)$^d$ | morphology |
|---|---|---|---|---|---|
| IC* 10–117 | 100 | 93 k (1.60) | g55$S_C$*125$S_A$*140I | 8.6 | — |
| IC* 10–17 | 100 | 17 k (1.12) | $S_C$*122$S_A$*133I | 7.9 | — |
| SIC*10-107/45 | 30 | 125 k (1.09) | g102$S_C$*112$S_A$*117I | — | lamellar; 55Å |
| SIC*10–176/110 | 38 | 214 k (1.16) | g102$S_C$*117$S_A$*127I | 3.72 | lamellar |
| SIC*10–46/54 | 54 | 90 k (1.12) | g102$S_C$*118$S_A$*131I | — | lamellar; 452Å |
| SIC*10–8/9 | 53 | 14 k (1.08) | g82$S_C$*110$S_A$*120I | 1.89 | lamellar; 119Å |
| SIC*10–17/20 | 54 | 30 k (1.08) | g97$S_C$*116$S_A$*130I | 2.30 | lamellar; 202Å |
| SIC*10–23/30 | 58 | 40 k (1.07) | g100$S_C$*128$S_A$*138I | 3.35 | lamellar; 266Å |
| SIC*10–66/100 | 60 | 124 k (1.23) | g102$S_C$*116$S_A$*127I | 2.75 | inverted cylinder |
| SIC*10–41/63 | 61 | 67 k (1.12) | g102$S_C$*118$S_A$*130I | 2.13 | inverted cylinder |
| SIC*10–8/13 | 62 | 22 k (1.08) | g83$S_C$*118$S_A$*125I | 2.58 | inverted cylinder |

All homopolymers and block copolymers showed broad $S_C$* and $S_A$* mesophase transitions. The inverted cylinder morphology was exemplified by sample SIC*10-41/63, which had a glass transition ($T_g$) for the polystyrene block is observed at 102° C.; an $S_C$* to $S_A$* transition at 118° C., as confirmed by electro-optical switching studies. The $T_g$ for the FLC block could not be easily detected, but a slight pressure on the heated sample of the homopolymer, IC*10-17, revealed a softening temperature of ca. 55° C. D-spacings of 33.2, 21.3 and 13.3 A for the smectic layers (200), (300) and (500) reflections, respectively, and an average intermesogen spacing of 4.4 Å was observed by wide-angle X-ray diffraction (WAXD). Molecular modeling suggested a fully extended side group length of 38.2 Å with a tilt angle of 30° at room temperature (assuming bilayer packing). Small angle X-ray scattering (SAXS) suggested an inverted cylinder morphology, which was confirmed by cross-sectional transmission electron spectroscopy (TEM). See, FIG. 7. Lower molecular weight FLC-block copolymers had slightly lower transition temperature for both $S_C$* to $S_A$* and $S_A$* to I transitions.

Microdomain morphology. The microdomain morphology of the switchable FLC-coil block copolymer showed an inverted cylinder morphology with all of the cylinders parallel to the shearing direction. These results indicate that cylinders have been successfully used to unwind the FLC supramolecular helix to permit bistable switching.

The microdomain morphology was confirmed by SAXS combined with TEM microstructural data. For TEM investigations, it was necessary to first remove the copolymer film from the coated glass substrate. This was done by etching the glass substrate away with hydrofluoric acid (HF). An embedding epoxy was first applied to both protect the film during subsequent handling and allow for definitive labeling of electric field and shear direction.

The film was cut into sections approximately 30 nm thick at room temperature. The film was cut orthogonal to the electric field direction, along the shear axis and orthogonal to the shear axis. Sections were floated in deionized water and picked up on copper grids covered with thin amorphous carbon film. The sections were exposed to $RuO_4$ at room temperature for five minutes and the polystyrene regions were preferentially stained to appear dark in the TEM images. Bright field TEM was performed using a JEOL 200CX electron microscope operated at 100 kV.

Figure 7A:
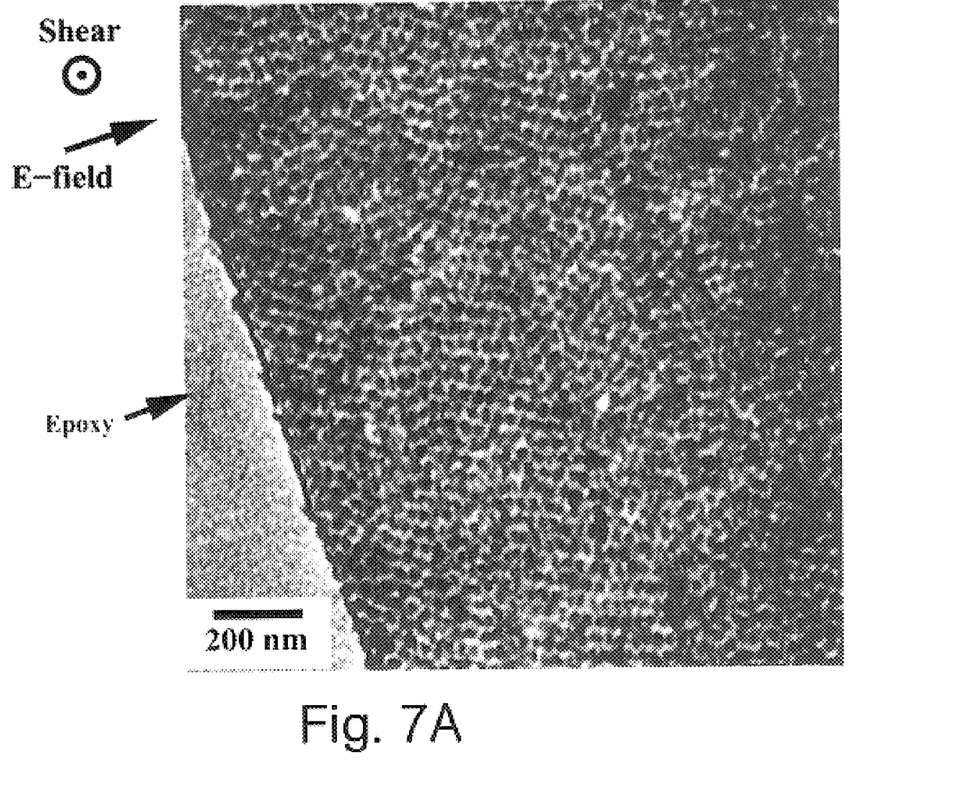

TEM images of the copolymer film viewed along the shear axis showed end-on polystyrene cylinders in a liquid crystal-isopolyisoprene matrix, as is shown FIG. 7A. The copolymer film has a composition of (PI-LC)/PS=63,000/41,000 and demonstrated bistable switching. The intercylinder spacing of these copolymers is 28 nm, with an LC domain of 10 nm and a polystyrene cylinder diameter of 18 nm. This result provides an estimated LC area fraction of 0.68, while the calculated volume fraction of the copolymer based upon molecular weight date is 0.58.

Figure 7B:
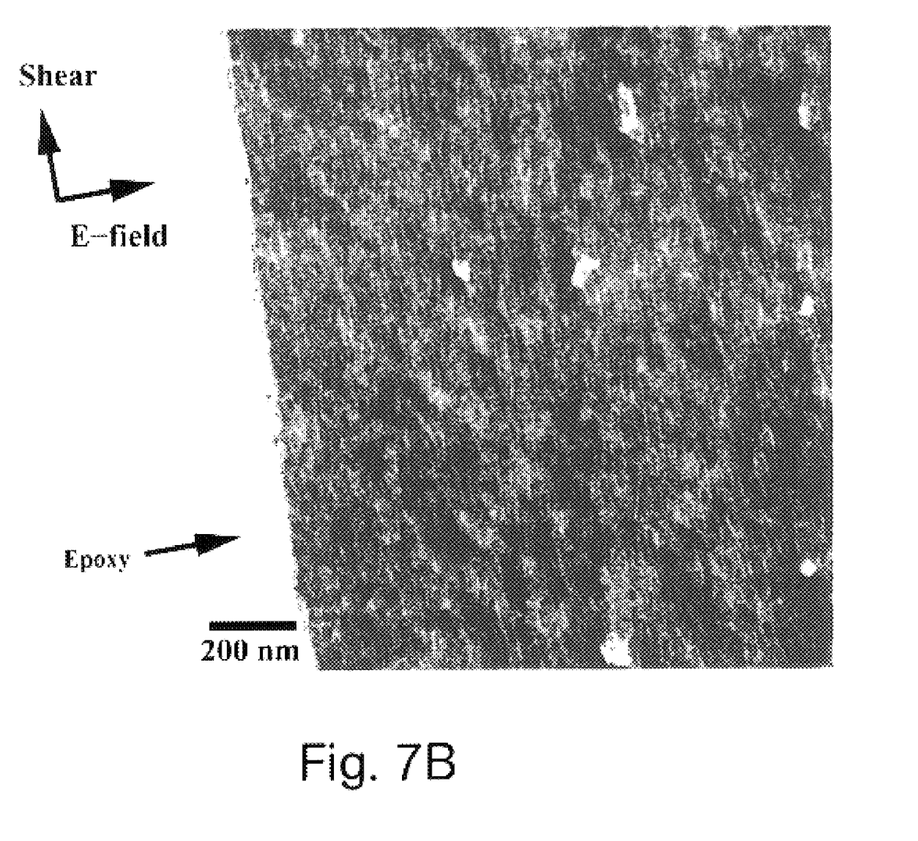

Images orthogonal to the electric field direction and to the shear direction show alternating layers of polystyrene and liquid crystal-polyisoprene (FIG. 7B). This is in agreement with the previous image, indicating that the copolymer morphology is polystyrene minority cylinders in a liquid crystal-polyisoprene matrix with cylinders aligned along the shear direction.

What is claimed is:

1. A microphase stabilized ferroelectric liquid crystal, comprising:
   a block copolymer, comprising at least one non-liquid crystal polymer block and at least one liquid crystal polymer block including a chiral mesogenic pendant group, the block copolymer comprising domains of the non-liquid crystal polymer and the liquid crystal polymer such that the non-liquid crystal polymer block forms an inverted cylinder morphology in a matrix of the liquid crystal polymer block, wherein the volume fraction of the liquid crystal block copolymer is in the range of about 90 vol % to about 50 vol %, and wherein spacings between cylinders is sufficient to unwind the smectic* helix and to permit switching of the chiral mesogenic group between two stable orientations.

2. The microphase stabilized ferroelectric liquid crystal of claim 1, wherein the liquid crystal block copolymer includes a chemical spacer disposed between the mesogenic pendant group and the liquid crystal polymer block.

3. The microphase stabilized ferroelectric liquid crystal of claim 1, wherein the spacing between cylinders is obtained by selection of a volume percent of the liquid crystal block copolymer.

4. The microphase stabilized ferroelectric liquid crystal of claim 2, wherein the chemical spacer is selected from the group consisting of methylene groups, $-(CH_2)_n-$, where n is in the range of about 2 to 15, siloxy groups and oxyethylene groups.

5. The microphase stabilized ferroelectric liquid crystal of claim 1, wherein the non-liquid crystal block copolymer is selected from the group consisting of poly(styrenic) polymers, poly(dienic) polymers, polysiloxanes, poly(vinyl ether)s and poly(methacrylate)s.

6. The microphase stabilized ferroelectric liquid crystal of claim 1, wherein the liquid crystal block copolymer is selected from the group consisting of mesogen-functionalized poly(styrenic) polymers, poly(dienic) polymers, polysiloxanes, poly(vinyl ether)s, poly(acrylate)s and poly(methacrylate)s.

7. The microphase stabilized ferroelectric liquid crystal of claim 1, wherein the mesogenic side group is selected from the group consisting of two, three and four phenylene ring mesogenic units, cycloaliphatic mesogenic units and pyrimidine mesogenic units.

8. The microphase stabilized ferroelectric liquid crystal of claim 1, wherein the volume fraction of the liquid crystal block copolymer is in the range of about 75 vol % to about 60 vol %.

9. The microphase stabilized ferroelectric liquid crystal of claim 1, wherein the spacing between cylinders is in the range of about 10 nm to about 20 nm.

10. The microphase stabilized ferroelectric liquid crystal of claim 1, wherein the spacing between cylinders is in the range of about 100 nm.

11. The microphase stabilized ferroelectric liquid crystal of claim 1, wherein the block copolymer undergoes self-organization, the self-organization taking place in an orienting field.

12. The microphase stabilized ferroelectric liquid crystal of claim 11, wherein the orienting field is selected from the group consisting of flow, magnetic field and electric field.

13. The microphase stabilized ferroelectric liquid crystal of claim 1, further comprising free mesogen localized in the liquid crystal block copolymer domain.

14. The microphase stabilized ferroelectric liquid crystal of claim 1, wherein the mesogenic side groups of the liquid crystal polymer block are organized into a bookshelf orientation.

15. The microphase stabilized ferroelectric liquid crystal of claim 1, wherein the total molecular weight of the block copolymer is in the range of about 15,000 to 500,00 g/mol.

16. The microphase stabilized ferroelectric liquid crystal of claim 1, wherein the molecular weight of the liquid crystal polymer block is in the range of about 10,000 to 250,000 g/mol.

17. The microphase stabilized ferroelectric liquid crystal of claim 1, wherein a supramolecular pitch of the liquid crystal polymer block is unwound.

18. A microphase stabilized ferroelectric liquid crystal, comprising:
   a ferroelectric liquid crystal;
   a first non-liquid crystal polymer block; and
   a second copolymer block including attachment sites along the polymer backbone for interaction with the ferroelectric liquid crystal,
   wherein the first and second polymer blocks are arranged into domains of first non-liquid crystal polymer and second copolymer such that the non-liquid crystal polymer forms an inverted cylinder morphology in a matrix of the second copolymer, wherein the volume fraction of the non-liquid crystal block copolymer is in the range of about 10 vol % to about 50 vol %, and such that the spacings between cylinders is sufficient to unwind the smectic* helix and to permit switching of the ferroelectric liquid crystal between two stable orientations.

19. The microphase stabilized ferroelectric liquid crystal of claim 18, wherein the spacing between cylinders sufficient to permit switching is obtained by selection of a volume percent of the second block polymer.

20. The microphase stabilized ferroelectric liquid crystal of claim 18, wherein the non-liquid crystal block polymer is selected from the group consisting of poly(styrenic) polymers, poly(dienic) polymers, polysiloxanes, poly(vinyl ether)s, poly(acrylate)s and poly(methacrylate)s.

21. The microphase stabilized ferroelectric liquid crystal of claim 18, further comprising additives which promote switching time.

22. The microphase stabilized ferroelectric liquid crystal of claim 21, wherein the additive are selected from the group of surfactants and plasticizers.

23. The microphase stabilized ferroelectric liquid crystal of claim 18, wherein the ferroelectric liquid crystal is selected from the group consisting of two, three and four phenylene ring mesogens, cycloaliphatic mesogens and pyrimidine mesogens.

24. The microphase stabilized ferroelectric liquid crystal of claim 18, wherein the volume fraction of the non-liquid crystal block polymer is in the range of about 25 vol % to about 40 vol %.

25. The microphase stabilized ferroelectric liquid crystal of claim 18, wherein the spacing between cylinders is in the range of about 10 nm to about 20 nm.

26. The microphase stabilized ferroelectric liquid crystal of claim 18, wherein the spacing between cylinders is in the range of about 100 nm.

27. The microphase stabilized ferroelectric liquid crystal of claim 18, further comprising free mesogen localized in the liquid crystal block polymer domain.

28. The microphase stabilized ferroelectric liquid crystal of claim 18, wherein the mesogenic side groups of the liquid crystal polymer block are organized into a bookshelf orientation.

29. An optical device, comprising:

opposing electrode surfaces; and a microphase separated ferroelectric liquid crystal disposed therebetween, said microphase separated stabilized ferroelectric liquid crystal comprising:

a block copolymer, comprising at least one non-liquid crystal polymer block and at least one polymer block including a chiral mesogenic side group, the block copolymer comprising domains of the non-liquid crystal polymer and domains of chiral mesogenic polymer such that the domains form an inverted cylinder morphology in a matrix of the liquid crystal polymer block, wherein the volume fraction of the chiral mesogenic block copolymer is in the range of about 90 vol % to about 50 vol %, and such that the spacings between cylinders is sufficient to unwind the smectic* helix and to permit switching of the chiral mesogenic group between two stable orientations.

30. The optical device of claim 28, wherein the thickness of the microphase separated ferroelectric liquid crystal is greater than about 3 $\mu$m.

31. The optical device of claim 28, wherein the device thickness is in the range of about 1 to about 100 microns.

32. The optical device of claim 28, wherein the device is characterized by bistable switching in an applied electrical field.

33. The optical device of claim 31, wherein the bistable switching is at a rate in the range of about 2 seconds to about 1 microsecond.

* * * * *

UNITED STATES PATENT AND TRADEMARK OFFICE
CERTIFICATE OF CORRECTION

PATENT NO.    : 6,132,819
DATED         : October 17, 2000
INVENTOR(S)   : Christopher K. Ober and Edwin L. Thomas It is certified that error appears in the above-identified patent and that said Letters Patent is hereby corrected as shown below:

Title page,
OTHER PUBLICATIONS, within the Omenat et al. reference title, replace "Physical Propoerties" with -- Physical Properties --;

Column 3,
Line 55, replace "(A) at 110 without shearing" with -- (A) at 110° C. without shearing --;

Column 6,
Line 37, replace "for use preparation of" with -- for use in the preparation of --;

Column 7,
Line 17, replace "represent the example of first bistable" with -- represent the first example of bistable --;
Line 59, replace "110°" with -- 110° C. --.

Column 8,
Line 19, replace "Method of preparation of LC-block copolymers." with -- *Method of preparation of LC-block copolymers.* --;
Line 36, replace "1986). which are" to -- 1986), wich are --;
Line 38, replace "Synthesis of exemplary mesogen and FLC-coil diblock copolymer." with -- *Synthesis of exemplary mesogen and FLC-coil diblock copolyme.* --;
Line 47, replace "employed closed" with -- employed close --;
Line 50, replace "Synthesis" with -- *Synthesis* --;
Line 51, replace "1981:1" with -- 1981:1 --.

Column 9,
Line 8, replace "(C*10-ester, 4)" with -- C*10-ester, 4). --;
Line 47, replace "(C*10-acid, 5)" with -- (C*10-acid, 5). --;
Line 54, replace "(C*10-acid chloride, 6)" with -- (C*10-acid chloride, 6). --;
Line 67, replace "Macromolecule 30:2556" with -- *Macromolecule* 30:2556 --.

UNITED STATES PATENT AND TRADEMARK OFFICE
CERTIFICATE OF CORRECTION

PATENT NO. : 6,132,819
DATED : October 17, 2000
INVENTOR(S) : Christopher K. Ober and Edwin L. Thomas It is certified that error appears in the above-identified patent and that said Letters Patent is hereby corrected as shown below:

Column 10,
Line 12, replace "Liquid crystal phase behavior" with -- *Liquid crystal phase behavior* --;
Line 55, replace "13.3 A" with -- 13.3 Å --;
Line 66, replace "Microdomain morphology." with -- *Microdomain morphology.* --.

Column 12,
Line 42, replace "15,000 to 500,00 g/mol." with -- 15,000 to 500,000 g/mol. --.

Signed and Sealed this

Fifteenth Day of January, 2002

Attest:

JAMES E. ROGAN
*Director of the United States Patent and Trademark Office*

*Attesting Officer*